United States Patent [11] 3,615,690

[72] Inventors Frank J. Pratl
 Lisle;
 Frank D. Schampel, Lombard, both of Ill.
[21] Appl. No. 775,099
[22] Filed Nov. 12, 1968
[45] Patented Oct. 26, 1971
[73] Assignee Armour and Company
 Chicago, Ill.

[54] PREPARATION OF MEAT AND CHEESE PRODUCT
 10 Claims, No Drawings
[52] U.S. Cl. ........................................................ 99/107,
 99/108
[51] Int. Cl. ....................................................... A22c 18/00
[50] Field of Search ............................................ 99/107,
 108, 109, 115, 130

[56] References Cited
 UNITED STATES PATENTS
1,852,259 4/1932 Parsons ......................... 99/107 X
3,100,710 8/1963 Carlin ............................ 99/107
2,714,069 7/1955 Stuart et al. ................... 99/130 X Primary Examiner—Hyman Lord
Attorneys—Carl C. Batz and Tilton, Fallon & Lungmus ABSTRACT: Lean and fat meat, water, seasoning and flavoring materials together with gelatin are cooked, cooled, and pizza cheese incorporated in the mixture to bring the cheese to a stringy state, the mixture being introduced into a mold and chilled to shape the mixture as a solid mass, the gelatin being in an amount whereby upon chilling the mixture, the mixture becomes solid and sliceable, but when heated above about 110° F. breaking up the mass into a flowable, spreadable body.

PREPARATION OF MEAT AND CHEESE PRODUCT

BACKGROUND AND SUMMARY

In the preparation of a meat product in which seasoning and flavoring materials are introduced in substantial amount as for the preparation of pizza and the like, a problem is presented because during standing and storage, separation and segregation of the constituents, and particularly of the flavoring constituents, can occur. Further, in the application of the mixture to crackers, pie dough, or other breadstuffs, dripping of the fluid constituents occurs. An even application of the original proportioned mixture is not obtained. A problem is also presented in packaging the product.

We have discovered that by incorporating in the original meat, water, seasoning and flavoring mixture a substantial amount of gelatin and thereafter adding cheese, such as pizza (mozzarella) cheese, at a temperature at which the cheese reaches a stringy state, it is possible to obtain a solid meat product mass which looks like a summer sausage product and is sliceable. However, upon raising the temperature of a slice of the material above 110° F., the mass breaks up into a flowable and spreadable body. If the slice is applied to a cracker or other breadstuff material, a flowing portion of the slice as it breaks up enters the cracker and during further cooking tends to unite the meat body to the cracker or other breadstuff material. Finally, upon further cooking, the mixture, upon losing water, further solidifies to form a viscous body on the cracker or other breadstuff material, the body having the original desired proportion of the meat, seasoning and flavoring ingredients.

DETAILED DESCRIPTION

A meat mixture, such as, for example, a mixture used for sausage, meat pizza products, and the like, is mixed with the desired seasoning and flavoring materials and water. To the mixture is added gelatin and the mass then heated to a cooking temperature such as, for example, 160°–190° F. (preferably about 175° F.). The gelatin may be gradually dissolved in cold water with continuous stirring and the solution then added to the meat mixture before cooking.

After the mixture is cooked, it is allowed to cool to a lower temperature such as 135°–⅛° F. (preferably about 140° F.), and at this stage cheese such as pizza cheese (mozzarella cheese) is stirred into the mixture until the cheese has developed a stringy character. The mixture is still fluid enough to be pressed into a mold or into flexible casings, such as artificial or cellulose casings, and in such mold or casings the material is cooled preferably below 100° F. where, under the influence of the gelatin, the mass becomes firm and solid. By the term "mold" as used herein, we intend to include rigid metal or plastic molds into which the mixture is placed, as well as flexible cellulose or artificial casings into which the mixture is pressed.

The amount of gelatin will vary substantially depending upon the mixture of the ingredients, but we find generally that about 1–2 percent of gelatin by weight (preferably about 1.5 percent) is sufficient to render the meat mixture firm when the temperature is lowered to about 100° F. or lower. At the same time, the gelatin is effective in liquefying or breaking down when the mixture is heated to above 110° F. and breaking up the entire mass into a soft, flowable and spreadable body.

When the solid body from the casings or from the mold pan or container is sliced, preferably between 32°–40° F., it is found that the seasoning, flavoring and meat ingredients are in their original desired proportions, and when the slice is placed, for example, upon a cracker and the cracker and slice heated above 110° F., the slice breaks up into an amorphous, spreadable body upon the cracker and fluid portions flow into pores of the cracker, and as cooking proceeds these tend to adhere to the cracker and hold the meat body thereon.

When the meat slice is placed upon breadstuffs, such as pizza dough, finger rolls, English muffins, etc., the softened body has a spreadable consistency tending to merge into the breadstuff body so that no dripping occurs.

The cheese contributes not only to the appearance and flavor of the product, but also imparts the stringy characteristic while adding to the fluidity properties of the mixture.

After the product has been introduced into molds or casings, the temperature may be lowered below 100° and preferably in the range of 30–90° F. Excellent results are obtained when the temperature is 40°–60° F. If desired, the material may be frozen using a temperature of 0° to −40° F. and preferably in the range of 0° to −10° F. However, as stated above, it is not necessary to freeze the product and we prefer to shape the product in the mold at a temperature of about 30°–90° F. Thereafter the product may be stored using normal refrigeration temperatures.

In the heating stage, we find that the gelatin relaxes as the temperature approaches 100° F. and above 110° F. the mass becomes fluid, and the constituents, including the cheese, break up. As the material is heated, bubbling occurs in the slice of material and the particles separate so that the slice disappears into an amorphous mass. Since the slice at this stage may be upon an absorbent body, such as a cracker, bread crust, etc., dripping does not occur because fluid material passes into the porous body.

A further change in the product occurs when the amorphous body on the cracker or crust is heated further above evaporating temperatures and preferably into a range of 150° F. and above. In this stage, the fluid spreadable body changes again to a viscous semisolid and finally to a solid body. In the final stage just described, the meat and cheese body on the cracker or pie crust resembles pizza pie.

The product may be used in various forms. It may be used with pizza pie dough; it may be used in casings from chub size to large bologna size; it may be chilled and sold in aluminum pans and plastic freezer containers of very small sizes to bulk form sizes of 25–30-pound packages.

A small-diameter casing portion may be placed in a cored hotdog finger roll, wrapped in aluminum foil, and heated in an oven, the product, upon removal of the foil, being held in an upright position and eaten like a "hotdog."

The cocktail or canape style product may be applied to various brands and types of crackers as by placing a slice or chip upon a cracker, and the same may be heated in an oven.

The chilled product may be sliced and the slices separated by waxed paper, etc. Further, the sliced product may be heated to form a sauce which may be applied to vegetables, fish products, casserole dishes, etc.

Any suitable cheese may be employed but we prefer to employ a type of cheese which is referred to as "pizza cheese." Such cheese is also referred to as "mozzarella cheese," and it has the characteristic of becoming stringy when heated at temperatures of about 135°–150° F.

Specific examples illustrative of the invention may be set out as follows:

EXAMPLE I

A typical formula and method of preparing the product mix is set out as follows:

|  | Amount lbs. | oz. |
|---|---|---|
| Beef Chucks | 50 |  |
| Lean Picnic Pork Trimmings | 50 |  |
|  | 100 ps |  |
| Water | 30 |  |
| Durkee's Kaomel (Flake Fat) | 5 |  |
| Tomato Paste | 16 |  |
| Mozzarella Cheese | 20 |  |
| Whole Fennel Seed |  | 6 |
| Cracked Black Pepper |  | 1 |
| Jap Chili Pepper |  | 1 |
| Garlic Powder |  | 2 |
| Onion Powder |  |  |
| 6 |  |  |
| Salt | 4 |  |
| Dextrose | 4 |  |
| Oregano |  | 2 |
| Ground Anise |  | 1 |

| 275 Bloom Gelatin | 2 | 8 |
| --- | --- | --- |

Grind beef through ⅛-inch plate and pork and mozzarella cheese through ¼-inch plate. Dissolve gelatin in cold water. (Gradually add gelatin to water with continuous stirring.) Place all ingredients, except cheese, in a steam-jacketed kettle and heat to 175° F. Stir continually. Remove cooked product from kettle and let cool to 140°–150° F. Stir in cheese and stuff into casings or other containers as desired. Remove stuffed product to freezer for rapid chilling and after 1 to 2 hours, place in cooler.

When gelatin is added to cold water, it is mostly in a suspended state and dissolves completely only when the mixture is heated. Because all ingredients are heated to 175° F., it is in a completely dissolved or liquefied state in the mixture, and thus very fluid at this temperature.

If the pizza (mozzarella) cheese were placed in the kettle with the other ingredients and heated to 175° F., it would also become fluid and lose its identity among the other ingredients. By waiting until the mixture cools to about 140° F., the cheese is added and will melt only enough to become "stringy."

When the product mixture cools to about 140° F., it is still fluid enough to stuff into casings using a conventional sausage stuffer or to dip or pour into containers by hand. As the product cools, it becomes less fluid and approaches a semisolid state or begins to jell.

By cooling below 100° F., the mixture becomes solid and looks like summer sausage or other solid meat products, and it may be sliced readily into firm, thin slices.

The slices may be applied to a cracker or other breadstuff material, one slice to each cracker, or the slice may be broken into different shapes and applied to the breadstuff material.

Upon heating the cracker or breadstuff material carrying the slice in an oven or by other means to temperatures above 110° F. up to 400° F. and above, there is a quick and marked change in the character of the slice, the slice breaking up and the fluid material bubbling within the mass and flowing onto the cracker, etc.

Upon heating the product further to a temperature above 150° F. and for a time to permit evaporation of moisture, the mass upon the cracker, etc. becomes viscous and semisolid.

EXAMPLE II

The process was carried out as described in example I except that the product after the cheese was incorporated into the mixture was stuffed into frankfurter-size cellulose casings, and the frankfurter-type solid product was placed in a cored "-hotdog" finger roll, wrapped in aluminum foil, and heated in a 400° F. oven for about 10 minutes. During heating, the meat and cheese body melted or softened into a spreadable consistency. When the foil was removed, the bun could be held in an upright position and eaten like a "hotdog."

EXAMPLE III

The product was prepared as described in example I and a slice of the material was placed upon a cracker and heated in a 400° F. oven for 7–8 minutes. The patty produced by slicing the frankfurter-type roll was used both whole and split lengthwise.

EXAMPLE IV

The product was prepared as described in example I and the product in a cellulose casing was enclosed, after removal from the casing, in pastry in a manner similar to the product called "pig in a blanket." The pastry dough was made the previous day and wrapped around the product and frozen. On the following day, they were tempered 1/2 hour and then baked in a 400° F. oven for 20 minutes.

EXAMPLE V

The product was prepared as described in example I and shaped within cellulose casings, the casing being stripped from the solid product and the product sliced and placed on pizza dough. Additional shredded mozzarella cheese was sprinkled upon the pizza dough together with additional sauce and the product baked in an oven. The conventional-type pizza pie was produced.

EXAMPLE VI

The product prepared as described in example I was formed in slices and placed on English muffins, "sloppy Joe" muffins, enchiladas. The slices were also melted and served as sauce with halibut, shrimp, vegetables, etc.

In all the tests above described, it was found that the important seasoning and flavoring ingredients remained in their original desired proportion in admixture with the meat and cheese, and although the product was used after a substantial storage time, the solid form of the product when sliced retained the desired proportions. Further, the drip which occurred was absorbed by the bakery goods product, etc. to which the slices were applied.

While in the foregoing specification we have set out specific procedure in considerable detail for the purpose of illustrating embodiments of the invention, it will be understood that such details may be varied widely by those skilled in the art without departing from the spirit of our invention.

We claim:

1. In a process for preparing a meat and cheese product, the steps of mixing ground lean and fat meat, water, seasoning and flavoring materials together with gelatin, heating to cook the mixture, cooling the mixture, adding pizza cheese, which has the characteristic of becoming stringy when heated to a temperature of about 135°–150° F., to said mixture at a temperature in the range of about 135°–150° F. to bring the cheese to a stringy state, introducing the mixture into a mold, and chilling the mixture in the mold to shape the mixture as a solid mass, said gelatin in said mixture being in an amount whereby upon said chilling said mixture becomes solid and sliceable but when heated above 110° F. breaks up the mass into a flowable, spreadable body.

2. The process of claim 1 in which said solid mass is sliced and a slice placed upon a breadstuff piece and heated to about 110°–400° F.

3. The process of claim 2 in which said slice and piece are heated to 150°–400° F. to evaporate moisture and to render said slice of material semisolid and viscous.

4. The process of claim 1 in which the gelatin content of the mixture is 1–2 percent by weight of the mixture.

5. The process of claim 1 in which the gelatin content is about 1.5 percent by weight of the mixture.

6. The process of claim 1 in which said mixture is introduced into a mold to form an elongated solid and said solid is introduced into a cored roll and cooked within said roll.

7. The process of claim 1 in which the molded solid is placed upon dough and heated to a cooking temperature upon said dough.

8. The process of claim 1 in which the solid mixture is heated to form a sauce.

9. In a process for preparing a meat and cheese product, the steps of mixing lean and fat meat, water, seasoning and flavoring materials together with gelatin, heating the mixture to about 160°–190° F., cooling the mixture to about 135°–150° F. and incorporating in the hot mixture pizza cheese to bring the cheese to a stringy state, introducing the mixture into a mold, chilling the mass in the mold to a temperature below 100° F. to shape the mixture as a solid mass, and slicing the solid mass.

10. The process of claim 9 in which said mold is a flexible casing into which said mixture is introduced, the casing being removed, and the solid product being sliced.

* * * * *